US007605812B2

(12) United States Patent
McBagonluri et al.

(10) Patent No.: US 7,605,812 B2
(45) Date of Patent: Oct. 20, 2009

(54) INTELLIGENT MODELING METHOD AND SYSTEM FOR EARMOLD SHELL AND HEARING AID DESIGN

(75) Inventors: Fred McBagonluri, East Windsor, NJ (US); Joerg Bindner, Weisendorf (DE)

(73) Assignee: Siemens Aktiengesellschaft, Munich (DE)

( * ) Notice: Subject to any disclaimer, the term of this patent is extended or adjusted under 35 U.S.C. 154(b) by 393 days.

(21) Appl. No.: 11/612,616

(22) Filed: Dec. 19, 2006

(65) Prior Publication Data

US 2008/0143712 A1 Jun. 19, 2008

(51) Int. Cl.
*G06T 15/00* (2006.01)
(52) U.S. Cl. .................. 345/420; 345/619; 382/322; 700/103
(58) Field of Classification Search .......... 345/419, 345/420, 619; 382/322; 700/103
See application file for complete search history.

(56) References Cited

U.S. PATENT DOCUMENTS

| 5,257,203 | A | * | 10/1993 | Riley et al. ............. 700/163 |
| 5,850,229 | A | | 12/1998 | Edelsbrunner et al. |
| 7,286,679 | B2 | * | 10/2007 | Fang et al. ............. 381/322 |
| 2004/0107080 | A1 | | 6/2004 | Deichmann et al. |
| 2004/0165741 | A1 | | 8/2004 | Fang et al. |
| 2007/0189564 | A1 | | 8/2007 | McBagonluri et al. |

FOREIGN PATENT DOCUMENTS

| EP | 1 246 506 | 10/2002 |
| EP | 1 246 506 A1 | 10/2002 |
| EP | 1 345 470 | 9/2003 |
| EP | 1 345 470 A2 | 9/2003 |
| WO | WO 02/30157 | 4/2002 |
| WO | WO 02/30157 A2 | 4/2002 |
| WO | WO 2006/103236 | 10/2006 |
| WO | WO 2006/103236 A1 | 10/2006 |

OTHER PUBLICATIONS

Qiang Ji et al., "Machine Interpretation of CAD Data for Manufacturing Applications", ACM Computing Surveys, vol. 24, No. 3, pp. 264-311, Sep. 1997.
A. Z. Qamhiyah et al., "Geometric reasoning for the extraction of form features", Computer-Aided Design, vol. 28, No. 11, pp. 887-903, 1996.
Dave Elliman, "TIF2VEC, An Algorithm for Arc Segmentation in Engineering Drawings", Graphics Recognition Algorithms and Applications, D. Blostein and Y.-B. Kwon (Eds.), vol. 2390, pp. 350-358, 2002.
Eric Wahl et al., "Surflet-Pair-Relation Histograms: A Statistical 3D-Shape Representation for Rapid Classification", 3DIM 2003, 8 pgs.
Andrea Frome et al., "Recognizing Objects in Range Data Using Regional Point Descriptors", Proceedings of the European Conference on Computer Vision (ECCV), May 2004, pp. 224-237.

(Continued)

*Primary Examiner*—Phu K Nguyen
(74) *Attorney, Agent, or Firm*—Schiff Hardin LLP

(57) ABSTRACT

A method and appertaining system are provided for automatically modeling a hearing aid sheet design. A 3D geometric description of an undetailed shell model is received, and its features and associated descriptors are automatically extracted. These features are classified, and a database of existing shells and features is queried to determine if a stored shell model matches the received shell model or if stored features match one or more of the extracted features. If matches are found, then specific rules are implemented that have been previously stored and associated with the matched shell model or features on the received shell model. If no matches are found, then generalized binaural modeling rules are utilized based on the classified features.

23 Claims, 12 Drawing Sheets

OTHER PUBLICATIONS

Yossi Rubner et al., "Empirical Evaluation of Dissimilarity Measures for Color and Texture", Computer Vision and Image Understanding 84, pp. 25-43, 2001.

L. Hajder and D. Chetverikov, Robust 3D segmentation of multiple moving objects under weak perspective. ICCV 2005. 10th international conference on computer vision. Beijing, 2005.

Sagi Katz and Ayellet Tal, Hierarchical Mesh Decomposition using Fuzzy Clustering and Cuts, SIGGRAPH 2003, ACM Transactions on Graphics, vol. 22, Issue 3, Jul. 2003, 954-961.

Y. Rubner, J. Puzicha, , C. Tomasi, and J. M. Buhmann Empirical Evaluation of Dissimilarity Measures for Color and Texture. Computer vision and Image Understanding 84, 25-43 Sep. 2001.

P. Thomas Fletcher, Statistical Variability in Nonlinear Spaces: applications to Shape Analysis and DT-MRI. PhD Dissertation. University of North Carolina, Chapel Hill, 2004.

Theodore Lim Ann Thien, "Lamina-based Feature Recognition and Applications in Manufacturing", PhD Thesis, Heriot-Watt University, Scotland, UK, Jul. 2000, pp. i-xv & 1-188.

* cited by examiner

INTELLIGENT MODELING METHOD AND SYSTEM FOR EARMOLD SHELL AND HEARING AID DESIGN

BACKGROUND

Recent advances in three dimensional modeling technologies have set the stage for direct automation of hearing aid design. Such advances have occurred in areas such as geometric reasoning, pattern recognition, automatic decomposition and feature extraction, advanced morphing technologies, geometric deformation mechanisms, modeling of flexible objects, inverse dynamic and dynamic constraints modeling. Furthermore, the development of robust mathematical underpinnings of computer graphics have enhanced a fundamental shift in 3-dimensional modeling paradigm. The previous reliance on heuristics and ad hoc methods are completely replaced by techniques based on a robust mathematical foundation.

The adaptation of such advances in three-dimension technology for accurate characterization of the ear canal physiology and external morphology provides an unprecedented impetus for hearing instrument design automation. Additionally, these advances have established an exciting basis for computer integrated manufacturing protocols.

One of the fundamental outcomes of the last quarter of a century is the brazen realization of computer aided feature detection and generation technology. This technology has made it possible to establish algorithmic systems for feature definition and taxonomy, feature modeling and representation, feature recognition protocols and interactions. The key approaches in feature recognition straddle two fundamental concepts: Surface and volume feature representation. Q. Xi and M. M. Marefat, "Machine Interpretation of CAD Data for Manufacturing Applications," *ACM Computing Surveys*, vol. 24, no. 3, pp. 264-311, September 1997. J. J. Shah, D. S. Nau, and M. Mantyla, *Adhances in Feature Based Manufacturing*, Amsterdam: Elsevier Science B. V., 1994. A. Z. Qamhiyah, R. D. Venter, and B. Benhabib, "Geometric Reasoning for the Extraction of Form Features," *CAD* vol. 28, no. 11, pp. 887-903, 1996. T. Lim, "Lamina—Based Feature Recognition and Applications in Manufacturing," PhD Thesis, Heriot-Watt Univ., Scotland, United Kingdom, July 2000.

The present invention is directed to a new hearing aid design and manufacturing technology that has the potential to revolutionize detailing and modeling of hearing instruments.

The advantages offered by this technology include, among other things, the complete elongation of manual interventions protocols inherent in the custom manufacturing of hearing instruments, increased throughput, insurance of collaborative instrument design between dispenser and manufacturing facility, intelligent and adaptive hearing systems design and consequently the complete work flow process automation of manufacturing of hearing aid instruments.

SUMMARY

The present invention is directed to a centralized knowledge-based advanced hearing aid modeling system. Various embodiments of the system comprise a modeling engine with an underlying business logic system and algorithmic infrastructure that facilitates hearing instrument design. The modeling engine is supported by an underlying data based system that hold historical or archived topological information of hearing instrument impressions, a standard and dynamic database system that hold mean model information and vector information, respectively.

The interaction between the modeling engine and the intelligent database system is facilitated through an in-process software interface. This system provides an innovative and modular software system envisioned to integrate modeling and detailing protocols onto a single platform. The architecture can be modularized such that components from the modeling enterprise can be re-used within the primary application system and in other secondary or external software systems. The objective is to replace the current piecemeal modeling solution work flow, where detailing and modeling are done in two separate software systems, with a single modeling interface system.

The current work flow is simply a legacy of the manual process where emphasis was placed on the individual technician skill set. To reduce complexity in shell manufacturing processes, people were trained to specialize. Thus, it is still quite common to have two sets of work flow in ISLE, manufacturing where one set of individuals ("detaiers") specialize in the reduction of an earmold impression to the prescribed shell type ("detailing"). The subsequent addition of features and components simulation to optimize the shell ("modeling") was accomplished by another set of experts ("modelers"). Secondly, the envisioned system can be automated to overcome the manually interactive protocols currently available in the existing software systems.

The present software system and method augment shelf manufacturing protocols using feature recognition research as well as rule-based and device optimization modeling protocols to achieve automation. This software solution is capable of revolutionizing the hearing aid industry, and provides the first known complete knowledge-based automated modeling system for the industry. Salient components of this system include: automated shell features identification, shell decomposition protocols, the instantiation of automated component and rule based protocols, the application of geometric descriptors to classify shell types, advanced shell inspection and qualification protocols, and the optimization of these components using an experienced knowledge-based algorithms.

The salient functionality of the systems, according to various embodiments include the following:

1. The quantification of the ear impression as a mathematical model decomposable into characteristic constitutive features.
2. Each constitutive feature can be indexed and archived in a holding database system.
3. Additionally, vector parameters and geometric descriptors of the impression features can be archived along with the constitutive features.
4. The database system can be grown by adding a new data set through further decomposition of a new impression data set.
5. The database system can identify, when a new dataset is being archived, whether similar models/matches exist: if so, it can duly inform the expert; if not, it can silently archive the new impression.
6. The data base system can have the capability to perform area matching, feature matching and boundary comparison through rigid and nonrigid registration of archived and new decomposed feature sets.
7. The database can additional be able to cater to mean models that are representative of best practices. In this case, the mean models can similarly have their feature set, as were as the solid model, archived.
8. The principal input of the data base system comprises the segmentation and decomposition, feature recognition, and feature classification protocols.

9. On the modeling side, the system may have the capability, to differentiate and to select the appropriate modeling protocols based on dynamic feedback from the database on the status of the selected data set, i.e., whether a match has been encountered or not.
10. In the case where a match has been encountered at the granular feature level, the system can adaptively apply the modeling protocols that were previously archived with the parent impression from which the features were extracted.
11. In the case where the feature match is at a global level, the corresponding mean model can be aligned to the new match through rigid registration, and subsequently morpheme to the final outcome.
12. In the case where there is definitively no match, the system can apply the rule-based binaural protocols defined for modeling the selected device type. Additionally, the system can decompose and archive the impression features for the historical database in order to grow this database with new input data.

The premise herein rests on the fact the retention of the hearing instruments in the patient's ear is a function of multiple and competing parameters, which may be illustrated by the following equation:

$$f = f(\kappa, \eta, \lambda, \xi, \epsilon, \psi, \theta) \quad (1)$$

where:
- $\kappa$: physical characteristics of the impression material such as shape index and curvedness;
- $\eta$: ear canal physiology degree of bend, twist, taper;
- $\lambda$: underling electro-acoustic technology, intensity of ear loss;
- $\xi$: manual interactive detailing and modeling protocols;
- $\phi$: expertise of the mold generator; and
- $\theta$: customer perception of quality.

These qualitative aspects of heating instrument dependent factors are characterizable by a Bayesian Weibull distribution as shown in equation (1) by applying Bayes's rule on two-parameter Weibull distribution and assuming the prior distribution of the form:

$$f(\beta, \eta | \text{Data}) = \frac{L(\beta, \eta)\varphi(\beta)\varphi(\eta)}{\int_0^\infty \int_0^\infty L(\beta, \eta)\varphi(\beta)\varphi(\eta)d\eta d\beta} \quad (2)$$

The invention seeks to capture these variables into a design system that is capable of proactively responding to the uniqueness of each ear canal and providing adaptive modeling infrastructure, algorithmic or adaptive to resolve an instrument design.

According to various embodiments of the invention, the system can autonomously detect features on impression scans, segment and classify; detected features, search through historical and dynamic databases of previously detected features and ideal feature representation infrastructure, and perform change detection followed by automatic modeling of the device.

Various embodiments of the invention can comprise: 1) a Computer Aided Feature Decomposition and Recognition System; 2) a Computer Aided Classification System; 3) an Advanced Database Support System; 4) Advanced Deformation and Morphing Systems; and 5) Rule-Based Binaural Modeling.

As described in more detail below, an implementation of an advanced intelligent based detailing and modeling system for hearing aid manufacturing is provided, as a framework for developing a novel virtual manufacturing system, which integrates the audiologist's office with manufacturing infrastructure. This technology can integrate the maintenance of a dynamic database system, which grows and maintains historical data, an advanced decomposition system that reduces a new impression into a readily recognizable topology forms, and an advanced modeling system that is dynamically activated based on real time database feedback and recognized physical attributes of the eat canal surface morphology.

Acronyms

The following acronyms are used throughout this document.

| Abbreviation | Explanation |
|---|---|
| BIA | Buildability Index Computation Algorithmic Tool |
| BTE | Behind-the-Ear; This refers to a class of hearing aid instruments in which a portion of the hearing aid instrument is located outside of the ear canal and behind the wearer's ear |
| CAAMA | Computer Aided Area Matching |
| CAFRMA | Computer Aided Feature Matching |
| CIC | Completely-in-the Canal; This is an ITE device that fit into the ear canal |
| DB | Database |
| FR | Feature Recognition |
| ITE | In-the-Ear; This is refers to a class of hearing aid instruments, usually the full concha type, that is embedded in the inner ear canal. |
| UI | User Interface |

DEFINITIONS

The following definitions apply for select terms used in this document:

| Term | Definition |
|---|---|
| Detailed impression/shell | The final representative detailed device obtained from the undetailed impression |
| Device | Device type when used in terms of ITEs means shell type. When used to described hearing instruments in general then it could be BTE or ITE |
| New Order | A work order that has never been processed by the software |
| Primary Impression | An impression which already exists in a DB with its modeling rules |
| Rule based, knowledge based | This refers to a series of human actions in detailing and modeling that is being transfer into a knowledge based software system |
| Secondary Impression | New Order |
| Shell Type | Refers to the five key ITEs that are fitted to a patient to assist with hearing or hearing instrument |

| Term | Definition |
| --- | --- |
| Undetailed impression | A physical representation of the geometry of the inner ear |
| Work Order | Contains all the requirements for building a monaural or binaural order |
| Procrustes | Refers to the method of globally aligning objects by boundary points to a common position, orientation, and scale |

Accordingly, a method is provided for automatically modeling a hearing aid shell design, comprising: receiving a 3D geometric description of an undetailed shell model; automatically extracting features and associated descriptors from the received shell model; classifying the extracted features; querying a database to determine if a stored shell model matches the received shell model or if stored features match one or more of the extracted features, and: if yes, then implementing specific rules that have been previously stored and associated with the matched shell model or features on the received shell model; and if no, then implementing generalized binaural modeling rules based on the classified features.

Furthermore, a system for earmold shell and hearing aid design is provided, comprising: a computer aided feature decomposition and recognition system comprising: an input into which a 3D geometric description of an undetailed shell model is entered; and an algorithms for extracting features and associated descriptors from the received shell model; a computer aided classification system, comprising an algorithm for associating relevant extracted features with stored features; an advanced database support system, comprising: a historical database comprising information related to actual historical impression or shell features; a standard database comprising information related to idealized shell standard features; and a dynamic database comprising searchable vector features related to a hearing aid impression or shell; advanced deformation and morphing systems, comprising an algorithm for deforming a standard shell or standard feature obtained from the database support system; and a rule-based binaural modeling system, comprising algorithms based on geometric reasoning to determine which portion of the shell to modify.

DESCRIPTION OF THE DRAWINGS

The invention is illustrated by the following embodiments illustrated in the figures and explained in more detail below.

DETAILED DESCRIPTION OF THE PREFERRED EMBODIMENTS

Figure 1:
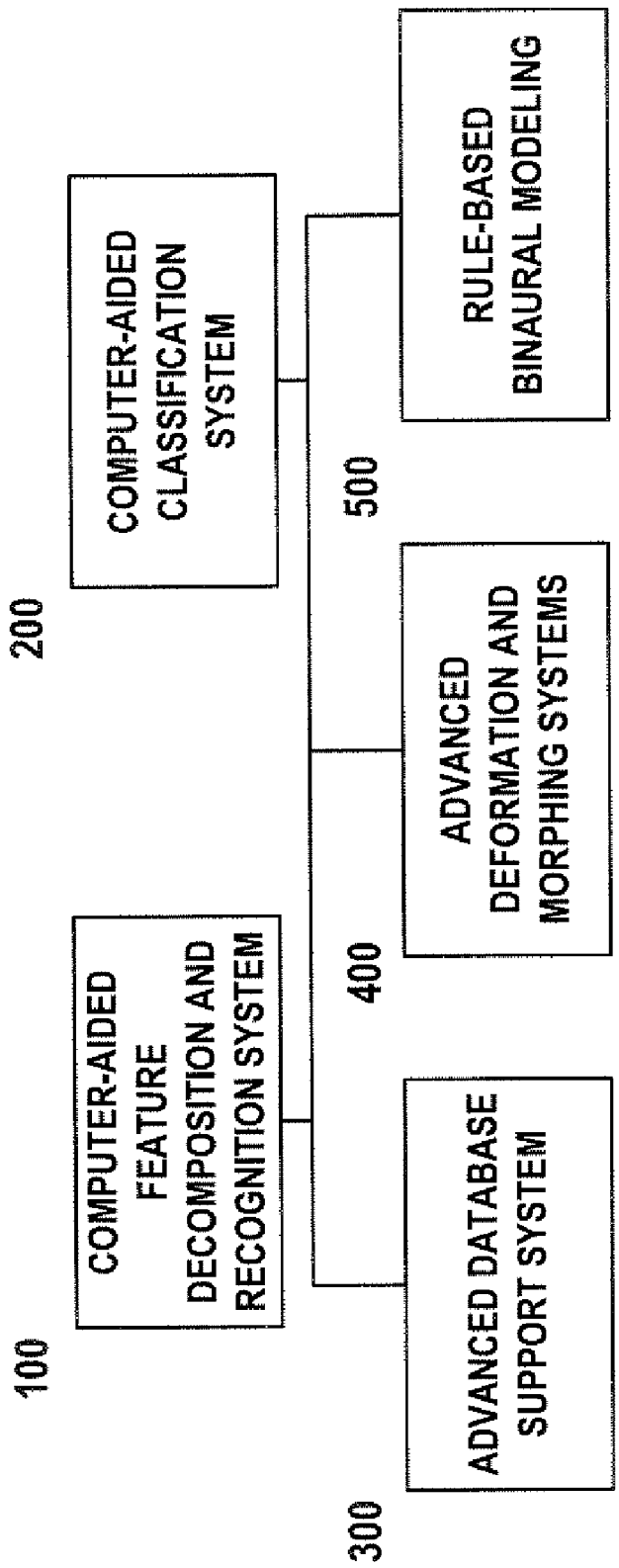
FIG. 1 is an overall block diagram illustrating the primary components.

The primary components of the system are illustrated in FIG. 1, which, as described above, are: 1) a Computer Aided Feature Decomposition and Recognition System 100; 2) a Computer Aided Classification System 200; 3) an Advanced Database Support System 300; 4) Advanced Deformation and Morphing Systems 400; and 5) Rule-Based Binaural Modeling 500.

The system described herein involves an implementation in which (see FIG. 3B): 1) existing data from an impression 20 (such as a historical or standardized forms) are subjected to a feature extraction 120 and analysis for entry into a database 302, versus 2) new data from a new impression 20' received along with a work order to manufacture a hearing aid based on the impression that are not only subjected to the feature extraction and analysis 120, but are also analyzed with respect to stored features in the database 302.

A work order for a new shell arrives to the modeling system along with relevant data defining the geometer of the shell. The impression 20 geometry is decomposed into descriptive topological features, and these features along with the overall point set are compared against shell designs and features found in the databases of the system. If close matches can be of and, then information retrieved from the databases related to the matched features can be utilized as a template. If close matches cannot be found, then other rule based detailing mechanisms such as binaural or monaural detailing can be utilized in the design processes.

It is important to note that the historical database system contain templates of best practices of different device types. These input data are collectively referred to within this embodiment as "mean models". Device types here include CIC, CA, MC, HS and ITE. Associated with these best practices are their corresponding decomposed features as well as the stepwise rule-based manual or electronic modeling process used to design them. Hence, when similarity analyses based on feature recognition and decomposition protocols are accomplished, the system has the ability of transforming the new impression based on the archive modeling information of the primary matching impression or mean model.

In the case where no match occurs in the archived database, these electronic interactive processes are evoked to create the new device. Such information is then transferred into the Database as a new candidate. Hence, the system is capable, where practical, to provide rapid verification of similarity between secondary and primary, impression and react accordingly.

1) Computer-Aided Feature Decomposition and Recognition System (100)

"Feature Recognition" is a generic term that is used to characterize a major body of knowledge primarily associated with identifying unique features or signatures of scientific data. The application areas of feature recognition vary from biometric data, robotics, and CAD/CAM/CAE applications. Within this embodiment, this term covers the identification of decomposed surface topology of a hearing instrument impression. This requires the implementation of an algorithm that facilitates the decomposition of a hearing impression into recognizable clusters, which are subsequently indexed and archived physically and algorithmically into a database. Furthermore, the alignment, registration, and matching by war, of established formal mechanisms, such as spherical harmonics, principal component analysis, principal geodesic analysis, are clearly within the scope of the invention.

This technology can be applied to the development of algorithms associated with principal hearing aid shell features and the extraction of such information for the development of automated modeling protocols for hearing aid manufacturing and address the organic shapes associated with the human ear canal.

Figure 2:
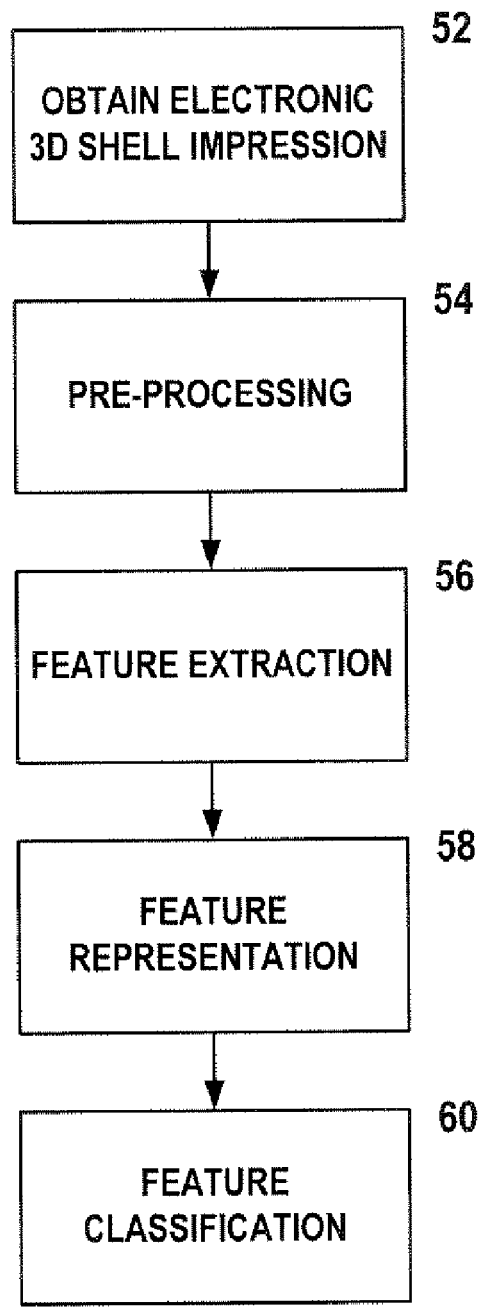
FIG. 2 is a flowchart illustrating the preliminary steps of feature extraction and classification.

FIG. 2 illustrates a general flow 50 of the preliminary part of this process. As illustrated, a digitized 3D geometric representation of a hearing aid shell is obtained 52 by digitizing a shell impression using any known techniques; this 3D geometric representation of the shell can be in any standard CAD format. The 3D geometric representation of the shell impression is then subject to preprocessing 54 where it is general broken down into a number of finite elements, such as slices, for further analysis. Next, the pre-processed impression data is analyzed by a feature extraction 56 algorithm that determines various features of the shell. A representation of the features is created 58, which permits the various features to be classified 60.

Figure 3A:
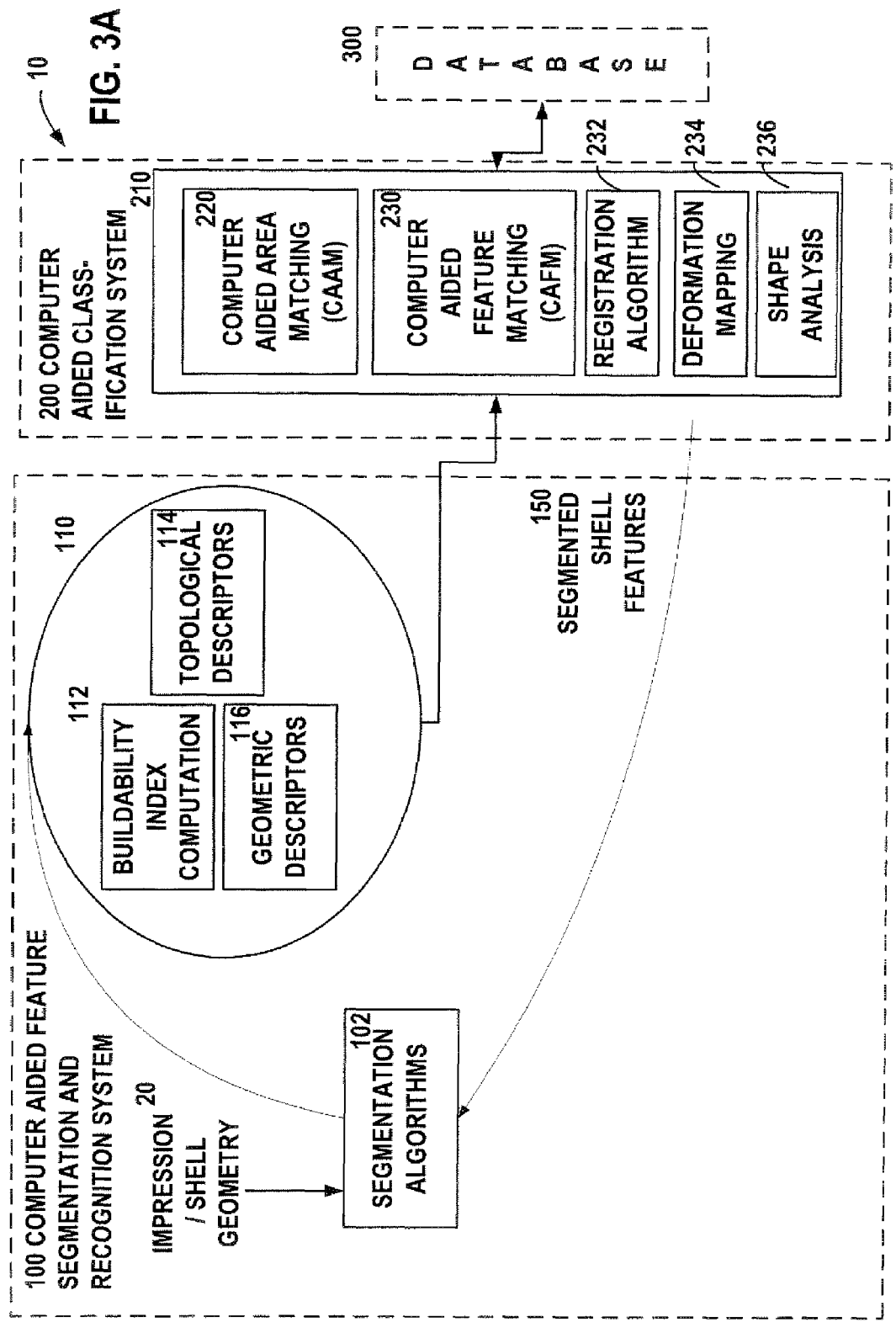
FIG. 3A is a block diagram illustrating decomposition and classification components.
Figure 3B:
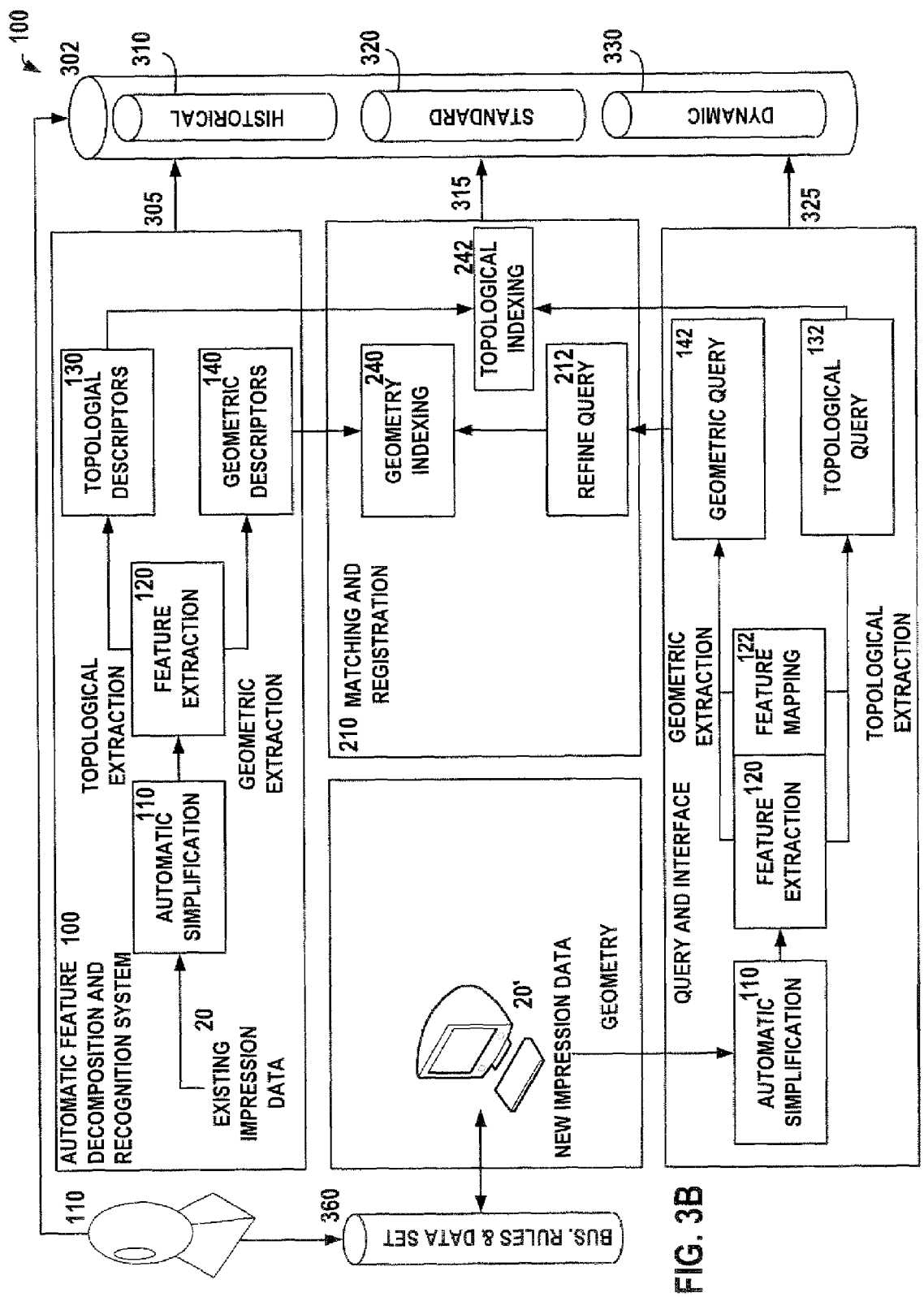
FIG. 3B is a block diagram illustrating components shown in FIG. 3A with the database and access into the database.
Figure 3C:
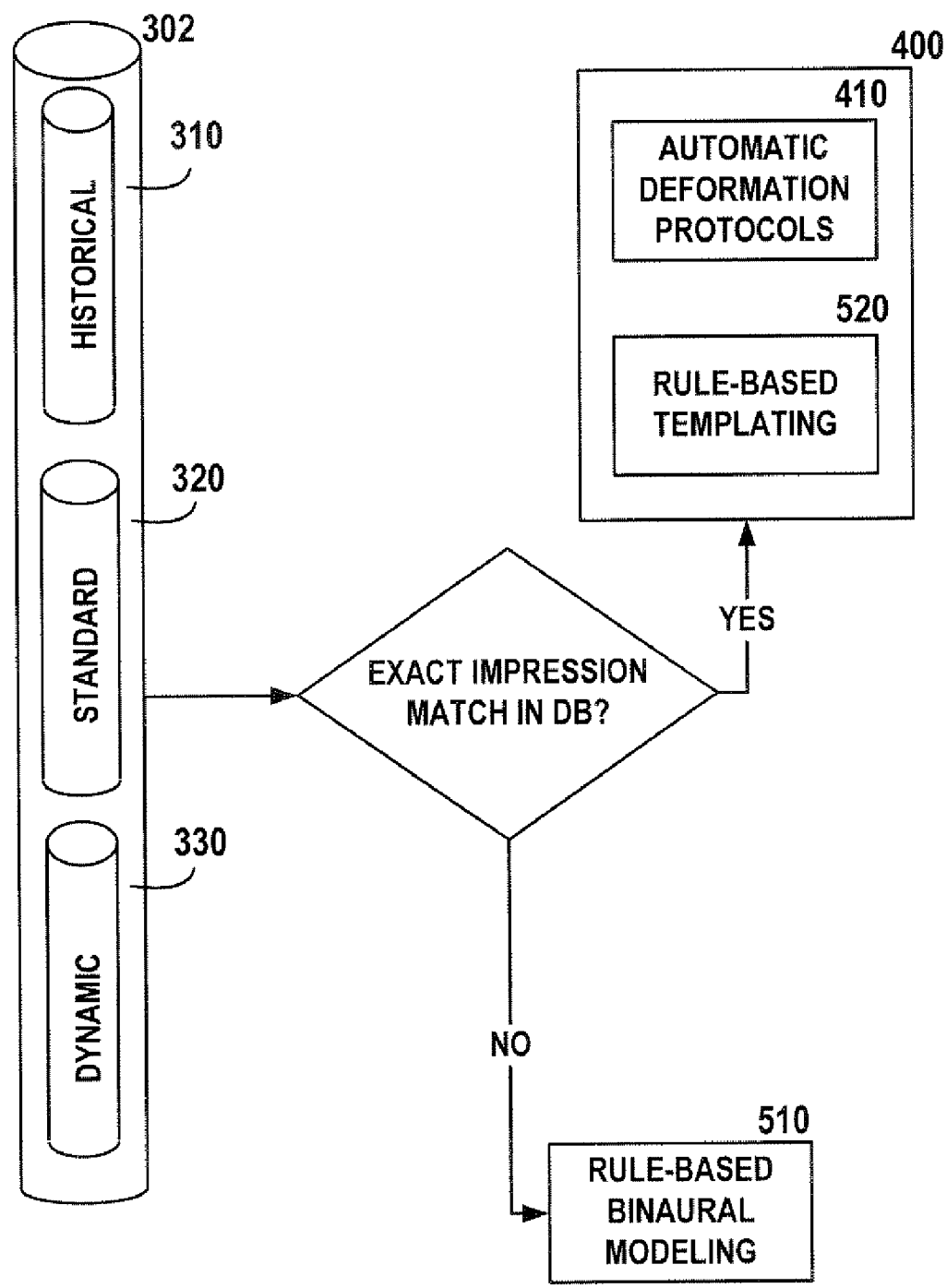
FIG. 3C is a block/flow diagram illustrating the matching and rule-based implementation.

FIGS. 3A-C illustrate a general data flow of information throughout the system. These aspects are explained in more detail below with regard to a preferred embodiment.

Shell Features and Extraction Information

The Computer-Aided Feature Decomposition and Recognition System 100 begins by a feature extraction 120 of the 3D shell representation 20. In a preferred embodiment, this component of the automatic modeling can, in real time, segment and detect shell features and attributes. The decomposition algorithms 102 are used to segment a shell impression 20 utilizing registration algorithms 232, deformation mapping 234 and shape analysis 236 into principle topological descriptors 114 and geometric descriptors 116 that can be identified and decomposed for cataloging.

The decomposition algorithms 102 divide the shell surface into representative segments. These segments/compartments include the trams region, the canal, the anti-tragus, the inter-tragal notch, concha, and helix. Each of these shell features plays a key role in ensuring the comfort and retention of hearing instruments during in-service life.

The similarity between one feature set extracted according to this embodiment and a corresponding feature within the database are achieved when the aligning algorithms are characteristically adapted for hearing instruments. These algorithms allow the alignments and comparisons to be achieved. Shell features are decomposed and extracted using optimization algorithms that detect divergence, concavity, convexity as well as local minima and maxima in local feature changes.

Buildability, index computations 112 may be performed as well, such as those disclosed in U.S. patent application Ser. No. 60/666,254, herein incorporated by reference, to determine if a given shell impression 20 has sufficient physical features and metrology to build the requested device type, and can serve as kick-out criteria for determining which automatic modeling system to use in modeling FIG. 3C).

Figure 4A:
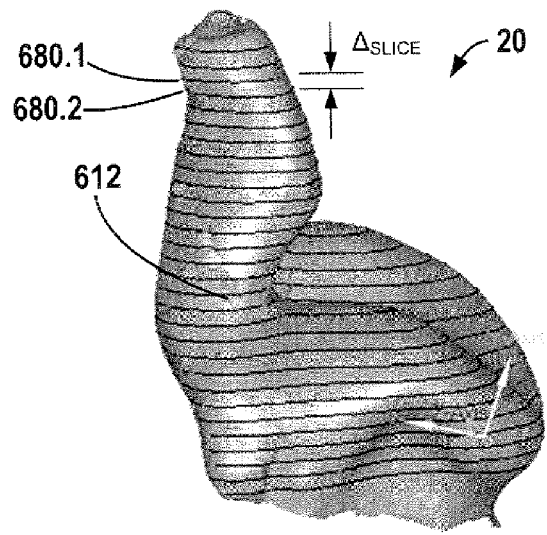
FIGS. 4A-C are pictorial diagrams illustrating the slicing mechanisms utilized for feature recognition.
Figure 4B:
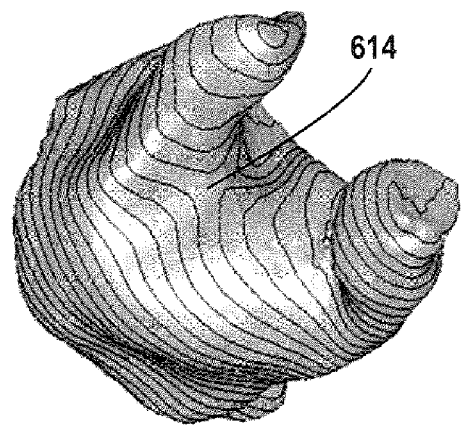
Figure 4C:
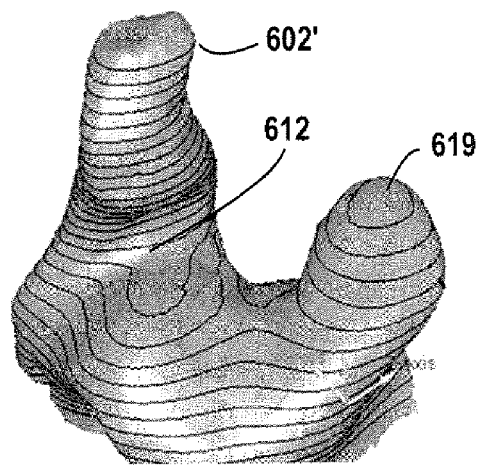

Referring to FIGS. 4A-4C, a shell 20 is illustrated showing multiple decomposition paths and the intersection of paths showing feature regions. The extractable shell features are the characteristic features that constitute a pristine undetailed shell impression 20. These features may be regional or local maxima and minima. The regional feature extraction 120 provides the basis for geometric reasoning on surface curvatures effects and on automatic mesh deformation. The local maxima and minima facilitate meteorological automation.

According to the decomposition protocols 102, 120 (FIG. 3A) and as illustrated in FIGS. 4A-4C, horizontal slices 680.1, 680.2 (collectively or generically, 680) are inserted into the shell impression 20 stacked vertically. Each slice 680 is usually generally elliptical in cross section, but could be of any geometric shape. The interslice distance $\Delta_{SLICE}$, which is the distance from one slice to its immediate neighbor, is set to a small value to improve accuracy. An interslice distance $\Delta_{SLICE}$ for hearing aid shells can be set to 0.001", which provides a good compromise between the needed accuracy and the computing power required, although any workable interslice distance $\Delta_{SLICE}$ can be selected, depending on the desired tradeoffs. This is a part of the automatic simplification 110 illustrated in FIG. 3B, and aspects are also included in the decomposition algorithms/protocols 102.

The cross section area of each elliptical slice 680 may be compared to its nearest neighbor 680 from the tip of the canal 602' downward. The major and minor axis of the elliptical slices could also be used. The difference in cross section areas may also be preset for accuracy. The algorithm 102, 120 monitors local changes in slices 680 to determine where a local feature has been encountered. For example, as illustrated in FIG. 4C, as the optimization process approaches the aperture 612, there is a sudden change in the slice 680 dimension.

The algorithm may then proceed slightly beyond the recognized changes and compare dimensionally or volumetrically the slice 680 to the preceding slices 680 for confirmation purposes. As can be seen from the Figures, the dramatic change of the slice 680 dimensions indicates that the aperture 612 has been detected, The algorithm may be further optimized to ensure that no false feature detection occurs by monitoring, in real time, regions beyond the local suspected region.

The following topological shell features are possible examples of those that can be identified and decomposed for cataloguing: 1) The identification of Left and Right Impressions; 2) Tragus; 3) Anti-Tragus; 4) Maximal and Minimal Aperture Diameters; 4) Aperture Ring; 5) Inter-Tragal Notch; 6) Crus Saddle Area; 7) Canal Tip; 8) Concha Boundary; 9) Concha Depth; 10) Concha Width; 11) Concha Depth; 12) First Bend; and 13) Second Bend. However, these are presented by way of example and should not be construed as limiting. The extraction of shell features 150 as well as information on dimensional parameters from these features serves as inputs to automated detailing protocols. By slicing the shell using these references, distinctive changes in intersecting contours can demarcate a location of key features. A more complete description of these features and associated analysis is described below.

Topological Features

Canal—(FIG. 5A, 602) The canal can be approximated with an elliptic cylinder that has a semi-minor and a semi-major axis. A circular cross section would a special elliptic case. The impression can be decomposed along three reference lines associated with the canal. These are:
(i) The minor axis;
(ii) The major axis; and
(iii) Parallel slices from the hollowed end or canal tip and centered on the geometric centerline of the canal.

Concha—(FIG. 5B, 610) A concha is the extensive region of the impression bounded by the aperture 612, the crus 614, and the anti-tragus 620. In some impressions, an inserted plane at the aperture 612 intersects the concha peak 610' and helix 616.

Concha Apex (Concha Peak)—(FIG. 5C, 610') This is geometrically the highest point on the concha 610. Measurement of shield depth references this point. This measurement can be accomplished by identifying the local maxima on the concha 610 and projecting a vertical line to an intersect plane at the hollowed end of the impression.

Detection of Left or Right Ear Impression—Left and right impressions can be determined as follows:
(1) Holding an impression horizontally on the hollowed end plane with the canal pointing up and the concha and anti-tragus pointed in the direction of the holder, the location of the helix provides the side of the impression;
(2) In special cases, the direction of the canal when the impression is held as described in (1) determines whether the impression is a left or right. A tilt of the canal to the right implies a right impressions and vice versa.

Tragus—(FIG. 5A, 604) This refers to the trough-shaped indentation at the lower end of the canal. The inter-tragal notch 605 separates it from the anitragus 620. A projected line along the canal tip downwards achieves a sharp drop in the tragus 604.

Focal Point of Tragus—(FIG. 5A, 604') The focal point of the tragus valley is the lowest point in the tragus. It is the point in the tragus where concavity is highest. It is a significant reference point in detailing, where the initial cut at the hollow end runs through its focal point.

Anti-Tragus—(FIG. 5C, 620) This feature is essentially a warp beneath the concha. It is separated from the concha by the inter-tragal notch. Vertically slicing along the minor axis of the canal causes major warps in the anti-tragus.

Inter-Tragal Notch—(FIG. 5A, 605) This is a ridge separating the traps and the anti-tragus and runs along the canal. It a stable feature on the impression and can be used for registration.

Heel—(FIG. 5C, 630) This is the lowest part of the inter-tragal notch 605. This region is usually removed during detailing otherwise it results in a sharp point on the finished shell.

Helix—(FIGS. 5B, 5D, 616) This is a spur separated from the canal 602 by a deep valley or the crus 614. When a shell is sliced perpendicular to the centerline, the helix 616 is often intersected by the plane along the aperture 612. The region above the intersecting plane is generally referred to as the helix 616. This region, however, also contains the anti-helix 618, which essentially a warp under the helix 616.

Anti-Helix—(FIGS. 5B, 5D, 618) This is an indentation under the helix.

Helix Ridge—(FIG. 5D, 617) This is the boundary between the Anti-helix and the Helix.

Helix Peak—(FIG. 5C, 619) This refers to the highest point on the helix.

Aperture—(FIGS. 5B-5D, 612) The aperture is the largest contour located at the entrance to the canal. It can be located as shown in FIG. 5F, when a dissecting plane along the geometric centerline intersects both the aperture and the helix.

Crus—(FIGS. 5B, 5D, 614) The Crus is a valley between the canal 602 and helix 616 regions. In general, a plane through the crus 614 demarcates the first cut (or second) for a half shell as shown in FIG. 5G. As shown in FIGS. 5H and 5I, it is a characteristically hyperbolic paraboloid region.

First and Second Bends—(FIG. 5J) The first and second bends are two curvatures points that occur between the aperture and the canal tip. They may or may not be distinct and are functions of ear canal curvature. The canal length is determined within this boundary by the audiogram. The longest canal is achieved at the second bend and the lowest at the first. In general, any automated implementation of canal length must be confined to these two contours on a vertical scan of the impression.

Angle of Twist—The twist in the canal length appears around the aperture. It appears as a rotation in the xy plane around the z-axis.

Angle of Bend—This refers to a change in direction in the canal length. Such sudden changes are observed along the first and second bends.

Resolved Angle—The resolved angle is the canal directional normal of the bony section of the impression.

Centerline Computation (Full Shell)—The centerline computation for a full can be accomplished in two steps: 1) The initial decomposition starts from the canal tip to the aperture; and 2) the second decomposition starts from the hollow of the shell.

Canal Centerline Computation (Between Aperture and Canal Tip)—A modified algorithmic implementation that computes a centerline from the aperture to canal tip is ideal for device types such as CIC, MC, etc., that do not required elaborate centerline compute on and in general have straight or slightly twisted canals. The canal centerline may facilitate the automated orientation of a canal cutting plane.

Dimensional Features

Dimensional features of a shell impression 20 can be extracted for background algorithmic computations. These are the features that can be used to provide and compute buildability indexes 112 of devices and as a quality control tool for shell impression quality. By way of example:

Canal Length—This is the length of the canal of an impression as measured from the geometric center of the aperture to the highest point on the canal tip or the elliptic center of the canal for CIC devices. For other device types the canal length is determined heuristically from the level of hearing loss. In general the correct definition is confined to the first and second bends.

Geometric Features/Descriptors

Geometric descriptors are different from the above-described topological shell features in that they are global descriptors of an object. Such descriptors include, among others: 1) center of gravity; 2) centroids; 3) Fourier descriptors; 4) curvature; and 5) invariant moments (Hu Moments) and 6) Spherical harmonics. By way of example, the centered of an ear impression is the sum of the centroids of the local or individual topological features that constitute the shell impression 20. So in the case of decomposition where the shell impression 20 is divided and sub-divided into identifiable features, each feature or topology can have a set of descriptors. These descriptors are used as classifiers of the features extracted from each impression.

Figure 6:
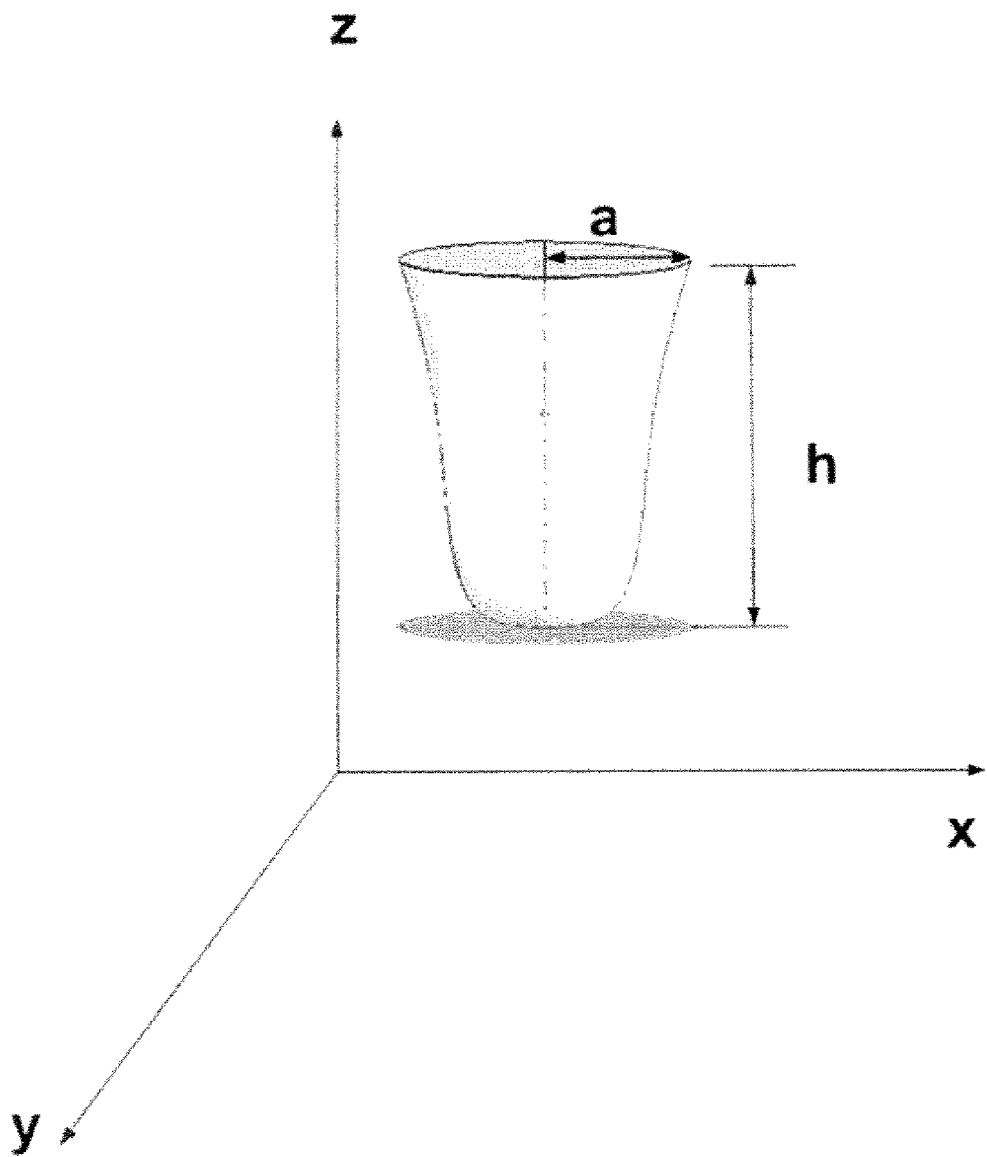
FIG. 6 is a perspective view of a shell as a paraboloid.

A typical shell descriptor, by way of example, could be its centered, which can be computed and used as the basis for a similarity analysis with a secondary impression. In a simplified example, the shell is defined as a paraboloid generated by rotating a 2-D profile along an elliptical cross section with centerline of the resulting paraboloid defined and passing through the elliptical center of the paraboloid. The resulting quadratic surface (hence referred to as a "quadratic surface") is represented by the following equation (see FIG. 6):

$$z = b(x^2 + y^2) + c \quad (3)$$

Let a and h be the radius and height of the quadratic surface, then equation (3) can be parameterized by substituting equation (4) into (3):

$$x(u, v) = a\sqrt{\frac{u}{h}} \cos v$$

$$y(u, v) = a\sqrt{\frac{u}{h}} \sin v \quad (4)$$

$$z(u, v) = u$$

Where $u \geq 0 v \in [0, 2\pi)$

The coefficients of the first fundamental are of the form given by equation (5):

$$E = 1 + \frac{a^2}{4hu} \quad (5)$$

$$F = 0$$

The coefficients of the Second Fundamental are of the form:

$$e = \frac{a^2}{2u\sqrt{a^2 + 4a^2}} \quad (6)$$

$$f = 0$$

$$g = \frac{2a^2 u}{\sqrt{a^4 + 4a^2 hu}}$$

The area element of the paraboloid is given by:

$$dS = \frac{\sqrt{a^2 + 4a^2 hu}}{2h} du \wedge dv \quad (7)$$

Integrating the area element:

$$S = \int_0^{2\pi} \int_0^h dSh = \frac{\pi a}{6h^2} \left[ (a^2 + 4h^2)^{3/2} - a^3 \right] \quad (8)$$

The Gaussian and mean curvatures of the paraboloid respectively are approximated by:

$$\kappa = \frac{4h^2}{(a^2 + 4hu)^2} \quad (9)$$

$$H = \frac{2h(a^2 + 2hu)}{\sqrt{a^4 + 4a^2 hu(a^2 + 4hu)}}$$

The value of We paraboloid of height h is then:

$$V = \pi \int_0^h \frac{a^2 z}{h} dz = \frac{1}{2} \pi ah \quad (10)$$

The weighted mean of z over the paraboloid is given by:

$$\langle z \rangle = \pi \int_0^h \frac{a^2 z}{h} dz = \frac{1}{3} \pi a^2 h^2 \quad (11)$$

The geometric centroid is given by:

$$\bar{z} = \frac{\langle z \rangle}{V} = \frac{2}{3} h \quad (12)$$

Figure 7A:
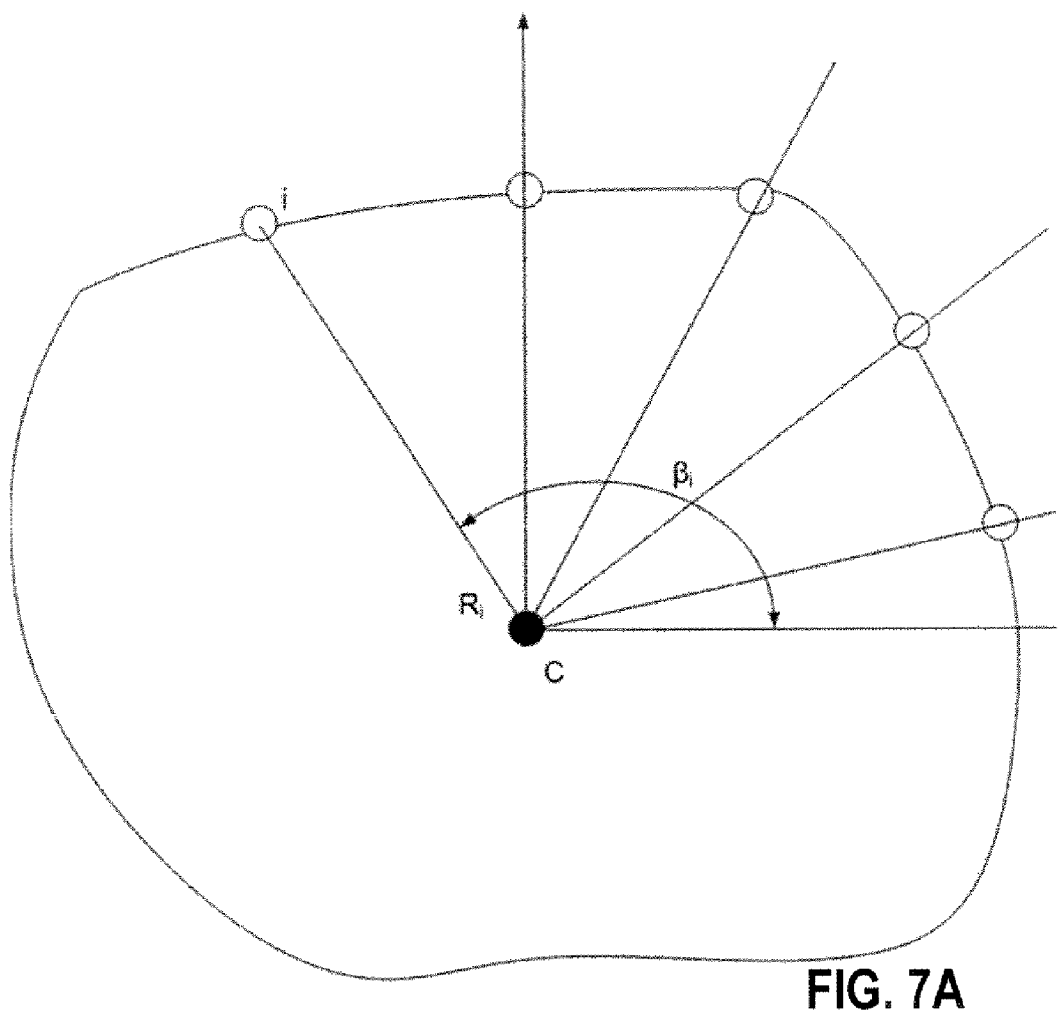
FIGS. 7A, B are pictorial diagrams illustrating a radial function with centered of object at C showing the parameters of the radial function.
Figure 7B:
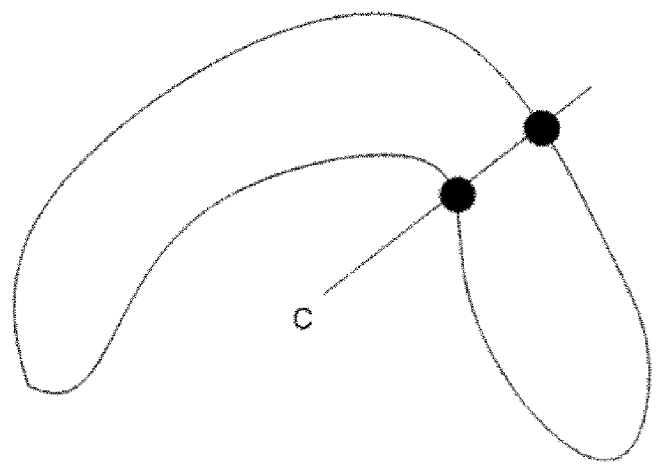

Based on the computed centroid of the shell a radial function $R(\beta)$ defined as a contour-based shape representation can be generated for analyzing the shape of the shell impression. FIG. 7A shows the distance R from the centroid of the contour to a contour point as a function of a polar angle, $\beta$ (FIG. 7B in cross-section). By extending the polar function along the Spline line of the shell, characteristic shell features can identified within areas of local minima and maxima. The function $R(\beta)$ is regenerative to shift, rotate and reflect. Martin D. Buhmann, M. J. Ablowitz (2003). *Radial Basis Functions: Theory and Implementations*. Cambridge University. J., Haider and D, Chetveiov, *Robust 3D segmentation of multiple moving objects under weak perspective*. ICCV 2005. 10th international conference on computer vision. Beijing, 2005.

The decomposition algorithms 12 may be supported by other geometric reasoning and business logic modules 20 within the system. The business logic modules 20 can deal with information related to all aspects of the ordering and manufacturing of the hearing aids, including costs, materials, inventory, ordering, scheduling, workflow, resources, etc.

2) Computer Aided Classification System (200)

Once the features have been recognized, they are then classified using indexing protocols according to the Computer Aided Classification System 200. As illustrated in FIG. 3A, the decomposed shell features 150 can be used for the computer aided matching 210, which includes computer aided area matching (CAAM) 220, and computer aided feature matching (CAFM) 230 algorithms in order to properly associate relevant features with those stored in the database. The segmentation of impression can occur at local and area levels. For instance, canal shape matching from a primary to a secondary impression occurs at an area level while matching of tragus and inter-tragal areas ate essentially features. Area and feature mapping can occur using rigid, non-rigid registration, clustering and boundary mapping.

A typical decomposition and recognition algorithm system takes an input mesh surface generated from the triangulation of a point set system of a corresponding hearing instrument impression and a positive integer k, which is the number of segments into which the mesh shall be decomposed.

The algorithm works by selecting a set of k faces of the triangulated surface or volume. Each of these segments is considered a "representative" face for a segment. For each non-representative face of the mesh, the probabilities of it belonging to each of the representative k segments is computed based on its distance to each of the k representative faces. The first representative is considered the face with the minimum sum of distances to all other faces of the mesh. The remaining k−1 representatives are then selected by repeatedly choosing the face with the maximum distances from all previously assigned representatives. This is a top-down approach and results in the decomposition of the mesh impression surface. See Sagi Katz and Avelet Tal, *Hierarchical Mesh Decomposition using Fuzzy Clustering and Cuts, SIGGRAPH* 2003, *ACM Transactions on Graphics*, Volume 22, Issue 3, July 2003, 954-961; D. Elliman, TIF2VEC, An Algorithm for Arc Decomposition in Engineering Drawings *Graphics Recognition Algorithms and Applications* D. Blostein and Y.-B. IKwon, eds., vol. 2390, *Lecture Notes in Computer Science*, Berlin, Germany: Springer-Verlag, pp. 350-358, 2002.

In FIG. 3B, it can be seen that new shell impression data 20' originating from a scan center 110 is stored in a business rules and data set database 360 as well as a historical database 310, which contains previous scans of impressions, features, attributes and snippets. Preexisting impression data 20 can be utilized to provide a foundation for the database, and undergoes similar processing as far as automatic simplification 110 and feature extraction 120 to generate topological 130 and geometric features and appertaining descriptors 140.

The Feature Extraction 120 and Classification 200 routines can, e.g., identify shell features, segment shell features into distinct identifiable parts (topological descriptors 130 and geometric descriptors 140), classify shell features according to type (e.g., canal, concha, etc.), catalog relevant shell features and aspects into a data base 302, cluster shell features in a database 302 based on topological similarities, and cluster shell features in a database 302 based on geometric similarities. The classification and extraction module 200 may be included as a component of a point cloud stitching algorithm. The extraction process is achieved from the decomposition of the shell into key segments. This could be a database comprising a population of impression concha, crus, etc. Each feature type is labeled within its kind. So we could have i . . . N different concha, j . . . M types of crus. During searching, a new concha can be matched against a population of concha and similarity is achieved when rotational, translation and scaling based minimum descriptors are matched.

The automatic recognition and classification system 200 automatically extracts features and classification information of each shell impression 20' at the end of scanning the shell to create the clustering and indexation of the 3D shell model as a background process. Extracted features are then stored with their topological 130 and geometric 140 descriptors as an attribute of the parent impression 20' in the back-end database 302 system, according to their geometric 240 and topological 242 indexing which establishes the bases for classification.

Generally, then, for a new impression, the undetailed shell impression 20 data is loaded into the processing algorithms with all of its associated attributes. Based on a shape analysis, the impression is decomposed into constitute features using the feature extraction and the feature recognition protocols 120. The features are mapped 232 so that a database query can be performed based on a topological quer, 132 and geometric quex, 1442 (which may be further refined 212).

These queries provide closest match shell impressions and features within the database to permit, among other things, an ability to automatically recognize shell types based on shape analysis, feature recognition protocols and registration. Furthermore, the queries provide the logical basis for the modeling enterprise systems Ideally, the information returned from the queries permit the software to identify all shell types, to identify unique shell types within each shell class, to identify that multiple shell uniqueness exists with global classification of shell types, and to perform change detection of shell features in the database 302. Change detection occurs when the system consistently recognizes a pattern of impression types within the same class. In this case, the system can effectively discard further data of the same type. Additionally when a data set in the data base is returned for rework or remake, the system can delete the historical data from the system. Hence the database remains pristine.

Furthermore, in cases where the similarity index is below a predetermined parametric threshold, the system can facilitate hint modeling. In this case, the system provides a stepwise guidance to the modeling system based on approximate input from historical experiences with similar data input.

Figure 3D:
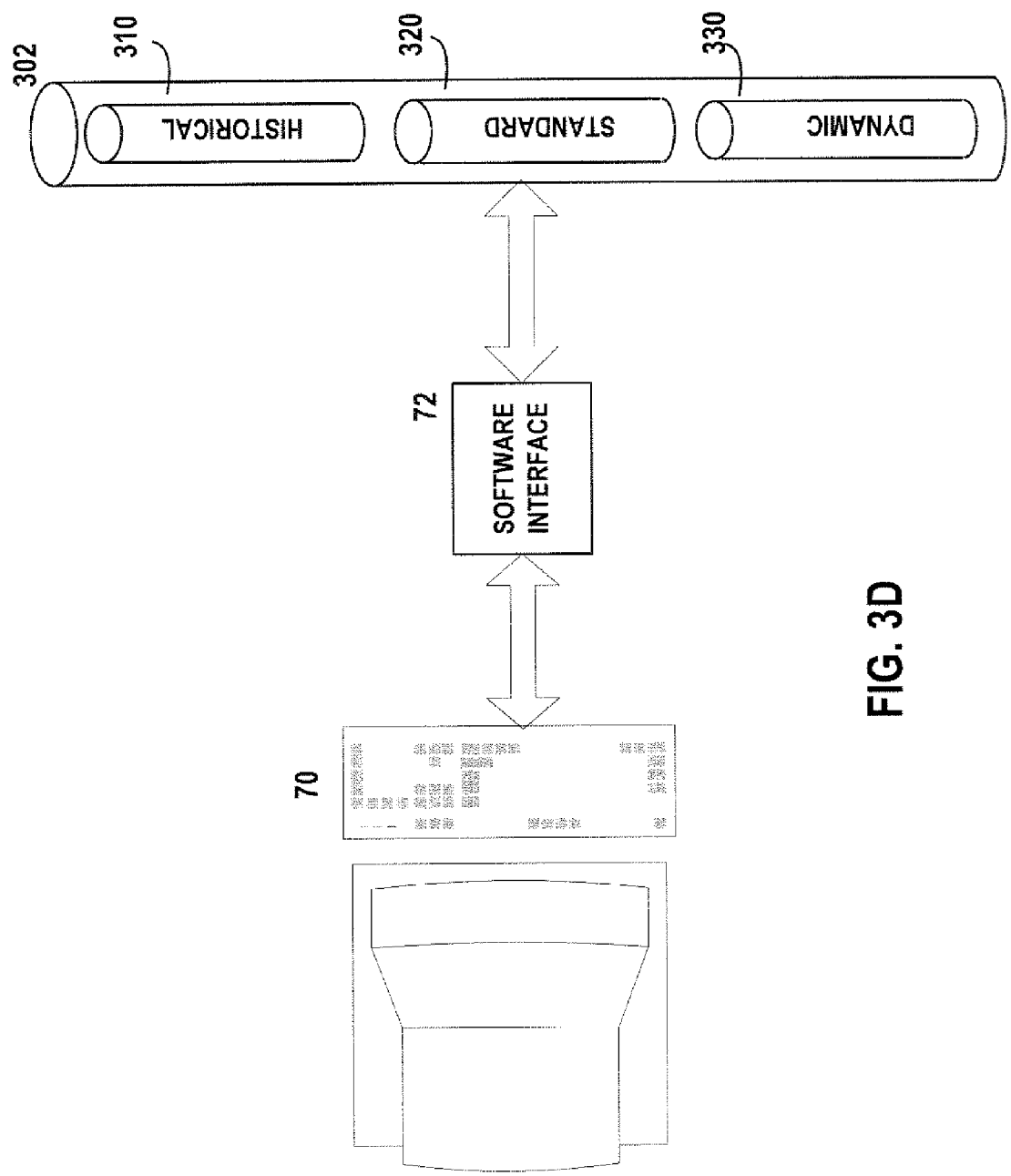
FIG. 3D is a block diagram illustrating the modeling enterprise system and database interface.

As shown in FIG. 3D, the interface 70, 72 between the backend (all of the database) systems 302 with the modeling system is facilitated through an in-process software interface 72, and appertaining system which can provide a number of salient capabilities, including: 1) a link to the backend system through an in-process software interface 72; 2) a new data set for modeling that can be input via a scanning device or via user input through a user interface device, such as a key board; 3) the modeling system can retrieve work order information from the business database system with options and segmented information, mean model information, or hint glance, as the case may be; 4) the system can display, in real time, the modeling step based on specific settings; and 5) the modeling system can also be capable of processing a work order entirely in a backend process without user intervention.

This component of the system 200 adaptively implements a classification mechanism capable of collating, identifying, classifying, and dimensioning shell features provided by the feature recognition module 100. This may be comprised of an expert system responsible for maintaining a library of historical 310, standard 320, and dynamic 330 shell configurations and respective features. New features can be dynamically added to the data base 302.

The Computer-Aided Feature Matching 230 may make use of advanced feature mapping algorithms, such as an Adaptive Wavelet Network, a Neural Network, Conformal Mapping, and Advanced Mesh Deformation Algorithms. These can be implemented to ensure accurate feature representation and to facilitate historical features searchable and matching within the databases 302. These are described in more detail in the following references: E. Wahl, U. Hillenbrand, and G. Hirzinger, "Surflet-pair-relation histogram: a statistical 3D-shape representation for rapid classification," 3DIM 2003, pp 474-481, October 2003; A. Johnson, Spin Images: A Representation for 3D-Surface Matching. PhD Thesis, Robotics Institute, Carnegie Melon University, Pittsburgh, Pa., August 1997; S.

Belongie, J. Malik, and J. Puzicha, "Shape matching and object recognition using shape context," in Pattern and machine Intelligence PAMI), vol 24 (3), 2002; S. K. Lodba and Y. Xiao, "Gsift: Geometric scale invariant feature transforms for data registration," in SPIE Conference on Vision Geometry XIV, 2005; A. Frome, D. Huber, R. Koluri, T. Bulow, and J Malik, "Recognizing objects in range data using regional point descriptors," in Proceedings of the European Conference on Computer Vision (ECCV), May 2004; and Y. Rubner, J. Puzicha, C. Tomasi, and J. M. Buhmann Empirical valuation of Dissimilarity Measures for Color and Texture. Computer vision and Image Understanding 84, 25-43 92001).

3) Advanced Database Support System to Support Classification and to Monitor Change Detection (300)

As mentioned above and as illustrated in FIGS. 3A-C, the intelligent modeling system 10 can be supported by three major data based systems (collectively 302), each with a specialized function. A historical database 310 contains feature attributes for classified and standard features on shell impressions 20 previously scanned and entered, and can be updated over time. It may include statistical parameters or aggregate information that may be useful for describing key features. The major sources of data for this system are from previous work orders of patient earmold impressions.

A standard database 320 contains ideal shell shapes with idealized feature dimensions that are encountered in real time physical production flow. These sets of data comprise ideal models generated by human expert systems. Such models could also be obtained from real work orders of patients that were never returned due to defect or for re-work. Finally, a dynamic database 330 comprises searchable vector features; this database 330 can store historical feature data but also enable real time retrieval of features as well. The principal sources of data for this system are decomposed feature information obtained from the historical and standard databases.

The generation of robust data base systems readily adaptable for hearing instrument design automation can be achieved using the following computation topology protocols:

Shape representation: This comprises basic shape representation methods, shape simplification, hierarchical methods, and deformable shapes for the car mold impression. These representation techniques decompose the shell surface into a mathematically quantifiable topology.

Shape descriptors: The decomposed surfaces can be represented quantitatively by histograms, harmonic maps, distance distribution, medial axis, and topology based methods.

Statistical shape analysis: Each segment of the impression topology can be confined to shape space, coordinate systems, procrustes distances, generalizations, and deformations. Shape analysis of a population of ear impressions can be realized within the framework of principal component analysis (PCA) and geodesic component analysis.

PCA provides the basis for effective parameterization of the inherent variability in a data set, and furthermore, it decreases the dimensionally of the data parameters. A Gaussian probability density distribution can be used to define a probability space of shapes. The problem of analyzing the shell of the impression is then formulated as a least squares approach, where the objective is to identify the linear subspaces in order to minimize the sum-of-squares of the residuals to the data. The linear subspace $v_k$ is defined by a basis of orthogonal vectors $v_k$ span ($\{v_1, \ldots, v_k\}$) where:

$$v_k = \underset{\|v\|=1}{\operatorname{argmin}} \sum_{i=1}^{N} \|x_i^k - \langle x_i^k, v \rangle v\|^2, \quad (14)$$

$$x_i^1 = x_i - \mu,$$

-continued
$$x_1^k = x_1^{k-1} - \langle x_1^{k-1}, v_{k-1} \rangle v_{k-1}$$

The Gaussian distribution function is given by:

$$p(x) = \frac{1}{2\pi^{\frac{n}{2}}|S|^{\frac{1}{2}}} \exp\left(-\frac{1}{2}(x-\mu)^T S^{-1}(x-\mu)\right) \quad (15)$$

where:

$$S = \frac{1}{N-1} \sum_{i=1}^{N} (x_i - \hat{\mu})(x_i - \hat{\mu})^T \quad (16)$$

$$\hat{\mu} = \frac{1}{N} \sum_{i=1}^{N} x_i \quad (17)$$

Shape matching and registration: The matching of a secondary impression with a primary impression can be achieved using rigid and nonrigid registration. Other methods readily available include: combinatorial methods, geometric hashing, ICP and its variants, graph matching, and entropy based methods.

Shape classification and clustering: Segments of ear mold impressions can be classified based on key shell segments, e.g. crus, concha, etc. Classification and clustering techniques employable include: geometric clustering, graph based methods, spectral methods, decision trees, and support vector machines.

Shape indexing: The database systems can provide functionality, to index all key topological features. The basic classification methods can include: indexing multidimensional data, proximity search, search engines, etc. P. Thomas Fletcher, Statistical Variability in Nonlinear Spaces: applications to Shape Analysis and DT-MRI. PhD Dissertation. University of North Carolina, Chapel Hill, 2004.

4) Advanced Deformation and Morphing Systems (400)

One of the key capabilities of the system is its ability to seamless process an impression into a prescribed device type. The implementation concepts include:

Template generation: where standard best practices are generated and stored as key reference or mean models. The standard part can be generated as a best practices object by an expert in the art or the rigid registration and unification of multiple devices of the same style. The template is referred to as the mean model for the given population of shell type. The mean model is then used as the initial model in the optimization. Each subsequent shell is then aligned to the mean model by translation, rotation and scaling. The formation of the secondary, impression or device is obtained by the global transformation of the model using an optimize objective function. This can be accomplished by using Principal Geodesic Deformation (PGD), which involves the optimization over parameters c=(c$_1$, . . . , C$_d$ that generate a deformed version of the mean object as given in the following equation:

$$M(c) = S.\operatorname{Exp}_\mu\left(\sum_{i=1}^{d} c_k \partial_k\right) \quad (18)$$

where S is a user defined similarity transform metric used to align the mean model to the secondary impression.

Mesh Deformation: In this approach, a standard and representative model obtained as described above is completely meshed and the geometric correspondences between the primary or reference mean object established with a secondary impression. Such correspondences can be established along the grid point of the mesh. The grid points or vertex of the mesh are established as volumetric control points.

The transfer of mean object information to secondary impression is established through the movement of the volumetric control point using Bezier interpolation as shown in Equation (19), where S, T, U are the axis of the secondary impression subdivided by control points. On the primary or mean object, a lattice of control points are constructed based on representative functional features associated with the pre-scribed shell type. This include, as mentioned previously, the crus, concha, intertragal notch, etc. The major features required for the accurate generation of each shell type is shown in the following table:

TABLE 1

Table of required features for shell types

| | CIC | Mini Canal | Canal | Half Shell | Full Shell |
|---|---|---|---|---|---|
| Bottom Plane | + | + | + | + | + |
| Tip | + | + | + | + | + |
| Rough Aperture | + | + | + | + | + |
| Center Spline | + | + | + | + | + |
| Local Coordinate | + | + | + | + | + |
| Concha | + | + | + | + | + |
| Notch | + | + | + | + | + |
| First Bend | + | + | + | + | + |
| Tragus | + | + | + | + | + |
| Anti-Tragus | + | + | + | + | + |
| Anti-Helix | + | + | + | + | + |
| Crus | + | + | + | + | + |
| CIC Aperture | + | | | | |

$$P = P_0 + s.S + t.T + u.U \qquad (19)$$

$$p_{ijk} = p_O + \frac{i}{l}S + \frac{j}{m}T + \frac{k}{n}U$$

$$P(s, t, u) = \sum_{i=0}^{l} \binom{l}{i}(1-s)^{l-i}$$

$$s^i \cdot \left( \sum_{j=0}^{m} \binom{m}{j}(1-t)^{m-j} t^j \cdot \left( \sum_{k=0}^{n} \binom{n}{k}(1-u)^{n-k} u^k p_{ijk} \right) \right)$$

5) Rule-Based Binaural Modeling Protocols (500)

The Intelligent Modeling System, shown in FIG. 3C, comprises three key functional components: 1) Rule-Based Detailing (binaural modeling 510); 2) Rule-Based Templating 520; and 3) Rule-Based Automatic Deformation Protocols 410.

When an order for a hearing aid shell 20 arrives at the manufacturing facility without a previous feature history, or that does not match a standard feature or mean model information in the database system 320, the Rule-Based Detailing engine utilizes the rule-based protocols for binaural modeling 510 evoked using business logical and feature recognition systems 100. It is important to note that while the business logical unit provides input for the required instrument model type and provides additional virtual components for device optimization, the features required to perform a rule modeling of the instrument are entirely dependent on the features recognized from the impression.

When an order for a hearing aid shell 20 arrives at the manufacturing facility that does match a standard ideal in terms of archived features, vector and descriptors, in the shell standard database library 302 (i.e., a geometric equivalent shell or shell features are located), then the Rule-Based Templating 520 utilizes rule-based templating protocols. The standard template is meshed, deformed and feature-wise aligned to the new impression.

Finally, the Rule-Based Automatic Deformation Protocols 410 utilize protocols that integrate both rule-based binaural detailing and rule-based templating 520. These protocols take advantage of an experienced data-based system and uses geometric reasoning to determine which portion of the shell shall be modified.

Figure 5A:
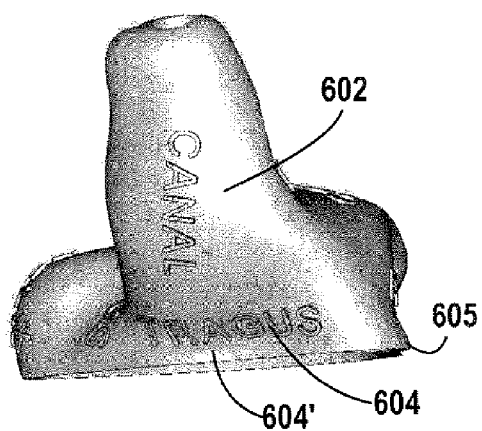
FIGS. 5A-J are pictorial diagrams illustrating the various shelf features.
Figure 5B:
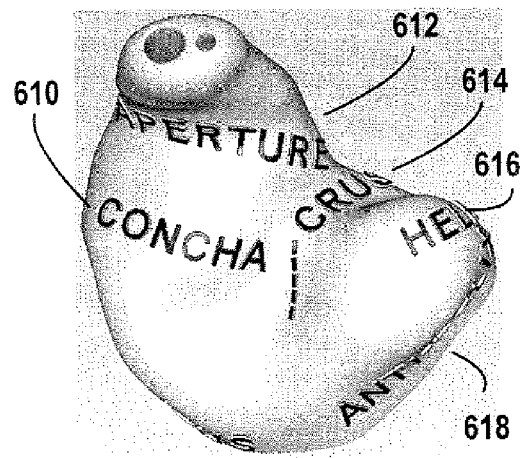
Figure 5C:
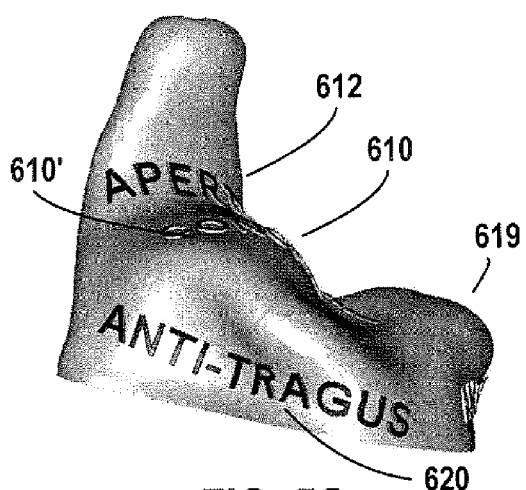
Figure 5D:
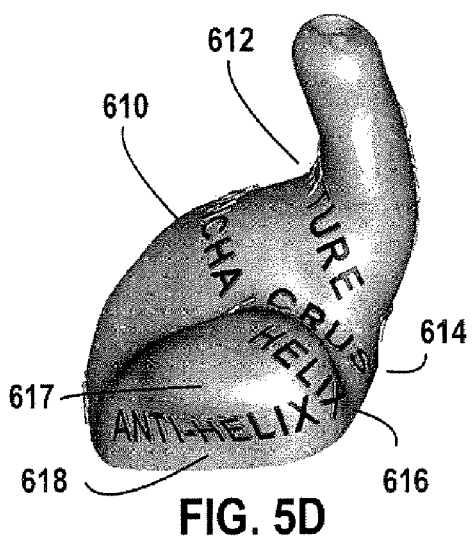
Figure 5E:
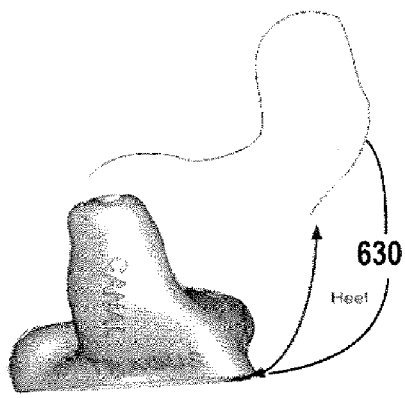
Figure 5F:
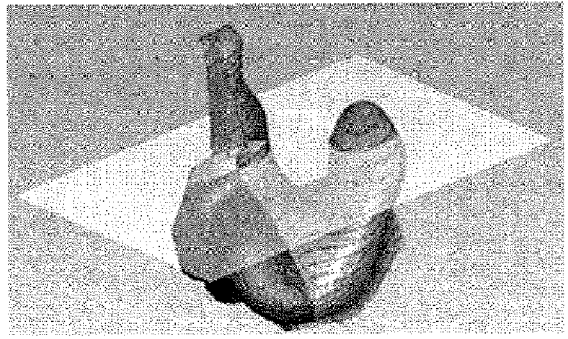
Figure 5G:
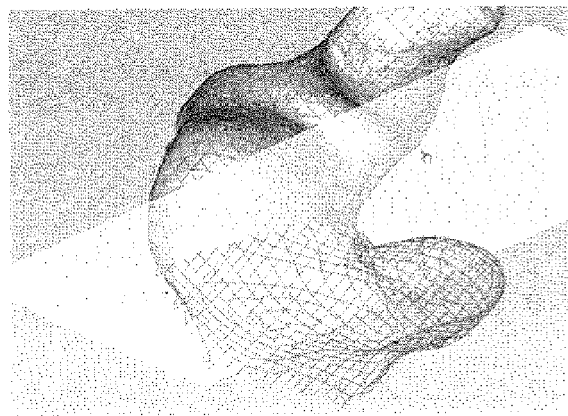
Figure 5H:
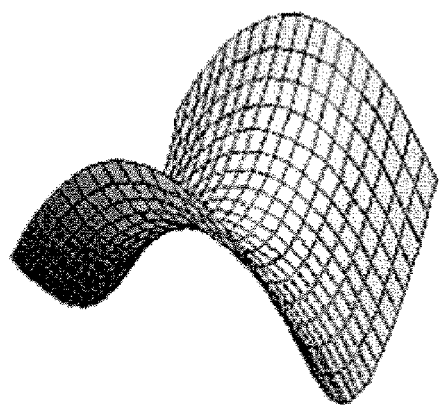
Figure 5I:
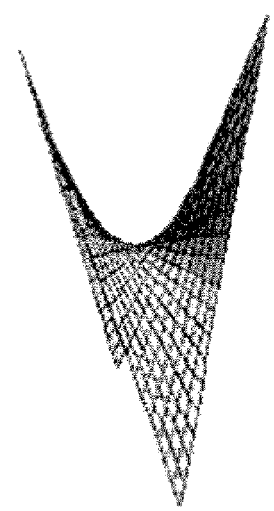
Figure 5J:
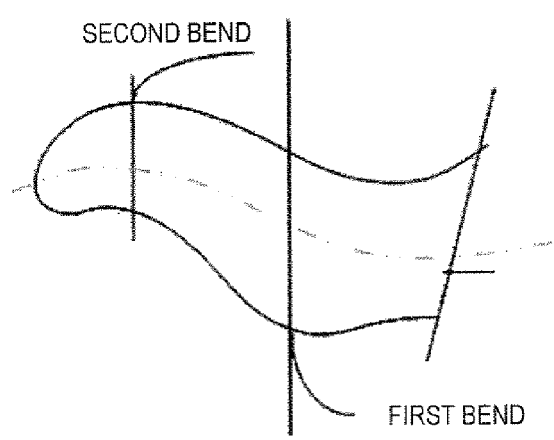

Using specific shed features as shown in FIG. 5A, an algorithmic protocol 800 can executed for primary cut operations using the following requirements: the system identifies and removes the concha of the impression by inserting a cutting plane along the crus 810. The crus can be eliminated using a configured level of Rounding—Crus Cut Round Plane 820.

The system measures the distance from the center of the tragus to the concha. The minimum dimension for a half-shell measure from the tragus to the concha can be configurable as the Shell Width. All material beyond the Shell Width can be removed with a configured Rounding A Low Angular Cut is inserted 830 at a configurable Angle (Cut Angle) from the inter-tragal notch to intersect a perpendicular line from the concha peak to the angular plane. The optimal shell height from the concha peak to the angle plane is configurable as the Concha Height. A Reduce to Device Cut 840 is made, and the final primary cut operations, the canal extension 850 and canal tapering 860, are subsequently performed. Cosmetic detailing, which includes artifact removal 870, is then performed.

Figure 8A:
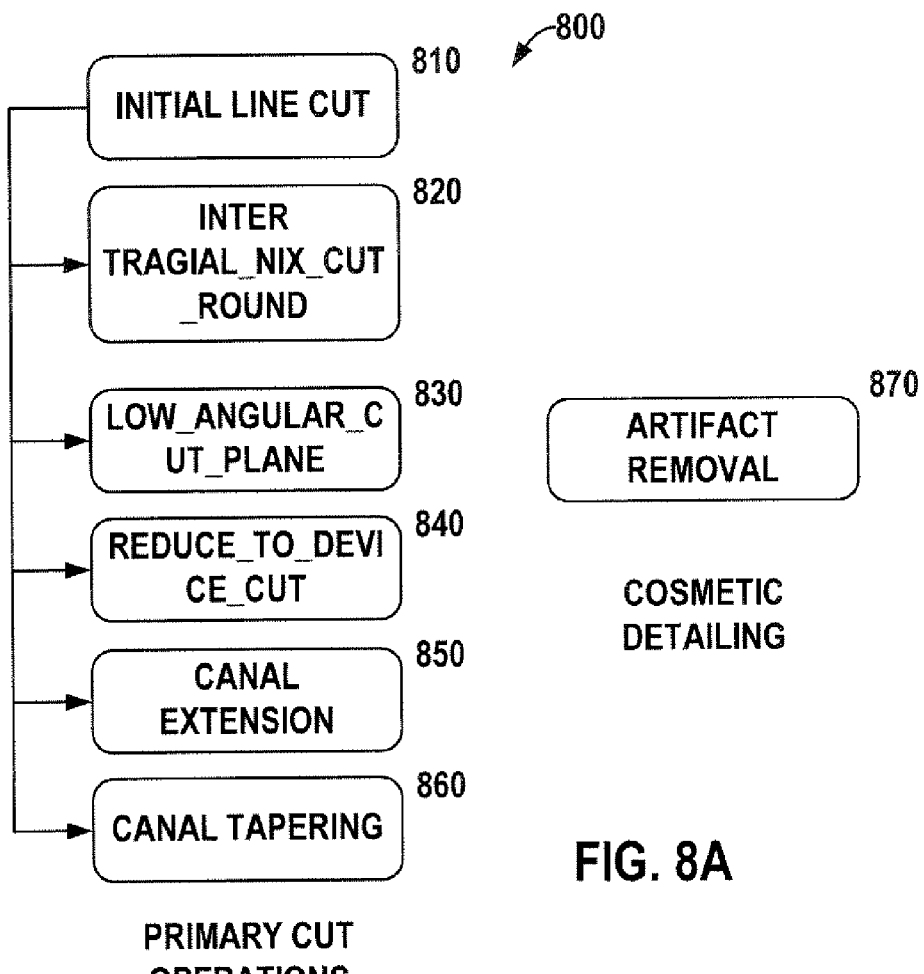
FIG. 8A is a flow diagram illustrating primary cut operations and cosmetic detailing.
Figure 8B:
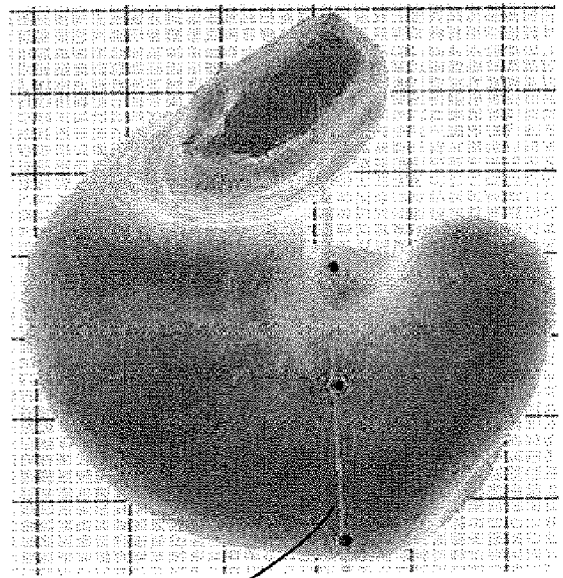
FIG. 8B is an image diagram illustrating a cut plane related to the ruler based cuts.

FIG. 8B illustrates a standard half-shell cut in the crus for the following shell types. CIC, MC, CA, and HS (Crus Cut Round).

All detailing rules can be adapted to modeled shells 20 within each classification domain. The rule cuts do not require user intervention. The software provides the ability to automatically match best practices in the database with a given impression. Within each device type, a cluster of classes (subclasses) exist. For instance, CICs have five subclasses: cone, bony, ball, S-shaped and standard that have been identified within a statistically acceptable sample size of hearing aid impressions. An algorithm for detailing may fail if not sufficiently adaptive to these subclasses. When this occurs, the system should dynamically revert to rule-based binaural detailing protocols.

The software can determine whether a given order is BTE or ITE, and this information is usually encoded in the nomenclature of the business system. Furthermore, the business database systems have the ability to segregate work order based on device type and shell types. Examples of shell types are CIC, CA, MC, HIS and examples of device type could be ITE or BTE Earmold. In any case, the backend systems are configured accordingly to differentiate the order type and to provide the requisite algorithm required to realized the design.

The various tools and techniques disclosed in U.S. patent application Ser. No. 11/347,151, herein incorporated by reference, may further be utilized in relevant aspects of this invention.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise lit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A method for automatically modeling performed by a computer a hearing aid shell to create the hearing aid shell from the model, comprising:
    receiving a 3D geometric description of an undetailed hearing aid shell model;
    automatically extracting features and associated descriptors from the received shell model;
    classifying the extracted features by breaking the 3D geometric description into finite elements, and performing comparative operations on adjacent elements to discern the features;
    querying a database to determine if a stored shell model matches the received undetailed shell model or if stored features match one or more of the extracted features, and
    if yes, then implementing specific rules that have been previously stored and associated with the matched shell model or features on the received shell model to create the hearing aid shell model;
    if no, then implementing generalized binaural modeling rules based on the classified features to create the hearing aid shell model; and
    creating the hearing aid shell from the hearing aid shell model.

2. The method according to claim 1, wherein the features comprise both topological features and geometric features.

3. The method according to claim 2, wherein:
    the topological features are selected from the group consisting of: an identification of left and right impressions, tragus, anti-tragus, maximal and minimal aperture diameters, aperture ring, inter-tragal notch, crus saddle area, canal tip, concha boundary, concha depth, concha width, concha depth, first bend, and second bend; and
    the geometric features are selected from the group consisting of: center of gravity, centroids, Fourier descriptors, curvature, invariant moments (Hu Moments), and spherical harmonics.

4. The method according to claim 1, wherein the elements are slices of a defined thickness.

5. The method according to claim 1, wherein classifying the extracted features comprises:
    performing a computer aided area matching; and
    performing a computer aided feature matching.

6. The method according to claim 5, wherein the computer aided feature matching utilizes a tool or technique selected from the group consisting of: an adaptive wave network, a neural network, conformal mapping, and advanced mesh deformation algorithms.

7. The method according to claim 6, further comprising:
    generating a mesh surface of the shell from triangulation of a point set system into k segments or faces; and
    decomposing the mesh surface of the shell based on a selection criteria related to a parameter of one or more of the k segments or faces.

8. The method according to claim 1, wherein classifying the extracted features comprises utilizing an expert system to classify the extracted features and to maintain a library of historical, standard and dynamic configurations and respective features.

9. The method according to claim 1, wherein querying the database comprises:
    querying topological features; and
    querying geometric features.

10. The method according to claim 1, wherein querying the database further comprises determining if the extracted features match.

11. The method according to claim 1, further comprising:
    providing within the database a historical database containing feature attributes for classified and standard features on shell impressions previously scanned and entered;
    providing within the database a standard database containing ideal shell shapes with idealized feature dimensions that are encountered in real time production flow; and
    providing within the database a dynamic database comprising searchable vector features.

12. The method according to claim 1, further comprising cataloging relevant extracted shell features and descriptors or rules into the database.

13. The method according to claim 12, further comprising utilizing the cataloged extracted shell features and descriptions or rules in a modeling of a subsequent hearing aid shell design.

14. The method according to claim 13, further comprising deleting historical data from the database related to a shell that has been returned for rework or remake.

15. The method according to claim 1, further comprising:
if the stored shell model matches the received shell model, then informing a user of the match; and
if a stored shell model does not match the received shell model, then archiving data related to the new shell without informing the user.

16. The method according to claim 1, further comprising:
defining and storing mean models in the database with a feature set and solid model.

17. The method according to claim 1, wherein:
a) when a feature match is encountered at a granular feature level, then adaptively applying modeling protocols previously archived from a parent impression;
b) when a feature match is encountered at a global level, aligning a corresponding mean model to the new impression utilizing rigid registration and then a subsequent morphing process; and
c) when no feature match is present, applying rule-based binaural protocols defined for modeling a selected device type.

18. The method according to claim 1, further comprising:
determining if a stored shell model matches the received shell model or if an a stored feature matches an extracted feature by calculating a similarity index based on a predetermined parametric threshold.

19. The method according to claim 18, further comprising:
providing stepwise guidance based on approximate input from historical experiences with similar data input if the similarity index is below a predetermined parametric threshold.

20. The method according to claim 1, wherein the database comprises three database components that includes a historical database, a standard database, and a dynamic database, the method further comprising:
entering information related to actual impression or shell features into the historical database for storage;
entering information related to idealized shell standard features into the standard database; and
entering searchable vector features related to a hearing aid impression or shell into the dynamic database and subsequently searching on these vector features.

21. The method according to claim 1, wherein if a stored shell or feature matches the received shell model, then:
applying an advanced deformation process to a mean model obtained from the database by optimizing over parameters that generate a deformed version of the mean model.

22. The method according to claim 21, wherein the advanced deformation utilizes a mesh deformation technique.

23. A system for earmold shell and hearing aid design, comprising:
a computer aided feature decomposition and recognition system comprising:
an input into which a 3D geometric description of an undetailed hearing aid shell model is entered; and
algorithms for extracting features and associated descriptors from the received shell model by breaking the 3D geometric description into finite elements, and performing comparative operations on adjacent elements to discern the features;
a computer aided classification system, comprising an algorithm for associating relevant extracted features with stored features;
an advanced database support system, comprising:
a historical database comprising information related to actual historical impression or shell features;
a standard database comprising information related to idealized shell standard features; and
a dynamic database comprising searchable vector features related to a hearing aid impression or shell;
advanced deformation and morphing systems, comprising an algorithm for deforming a standard shell or standard feature obtained from the database support system; and
a rule-based binaural modeling system, comprising algorithms based on geometric reasoning to determine which portion of the shell to modify.

* * * * *